United States Patent [19]

Lucas

[11] Patent Number: 5,349,776
[45] Date of Patent: Sep. 27, 1994

[54] ARTIFICIAL FISHING LURE

[76] Inventor: Mark H. Lucas, 12049 NE. 97th St., Kirkland, Wash. 98033

[21] Appl. No.: 85,506

[22] Filed: Jun. 30, 1993

[51] Int. Cl.$^5$ ............................................. A01K 85/00
[52] U.S. Cl. .................................. 43/42.39; 43/42.37
[58] Field of Search ................. 43/42.37, 42.39, 42.32, 43/42.34, 42.28, 42.29, 42.22

[56] References Cited

U.S. PATENT DOCUMENTS

| | | | |
|---|---|---|---|
| 1,787,733 | 1/1931 | Pagin | 43/42.34 |
| 2,235,600 | 3/1941 | Ammerman | 43/42.37 |
| 3,727,339 | 4/1973 | Le Master | 43/42.22 |
| 3,855,722 | 12/1974 | Moore | 43/42.37 |
| 4,045,903 | 9/1977 | Parker | 43/42.37 |
| 4,215,506 | 8/1980 | LeBoeuf | 43/42.28 |
| 4,495,722 | 1/1985 | Hess et al. | 43/42.39 |
| 4,998,373 | 3/1991 | Braswell | 43/42.37 |
| 5,175,955 | 1/1993 | Wilson et al. | 43/42.39 |

Primary Examiner—P. Austin Bradley
Assistant Examiner—Chuck Y. Mah
Attorney, Agent, or Firm—James Richard Vance

[57] ABSTRACT

This invention comprises a weighted, molded, artificial fishing lure having an enlarged belly and thinner torso relative to the belly. The lure generally resembles a wide variety of swimming forage fish and substantially maintains a proper upright orientation when towed through water. The lure also has a dorsal fin with a plurality of spiny rays extending upwardly from its back and a large, protruding eye located on each side of the lure. A hook, eye connector, fresh bait, or any desired configuration or color of jig, worm, apron, etc., may be integrally formed within or secured to a tail portion of the lure.

25 Claims, 3 Drawing Sheets

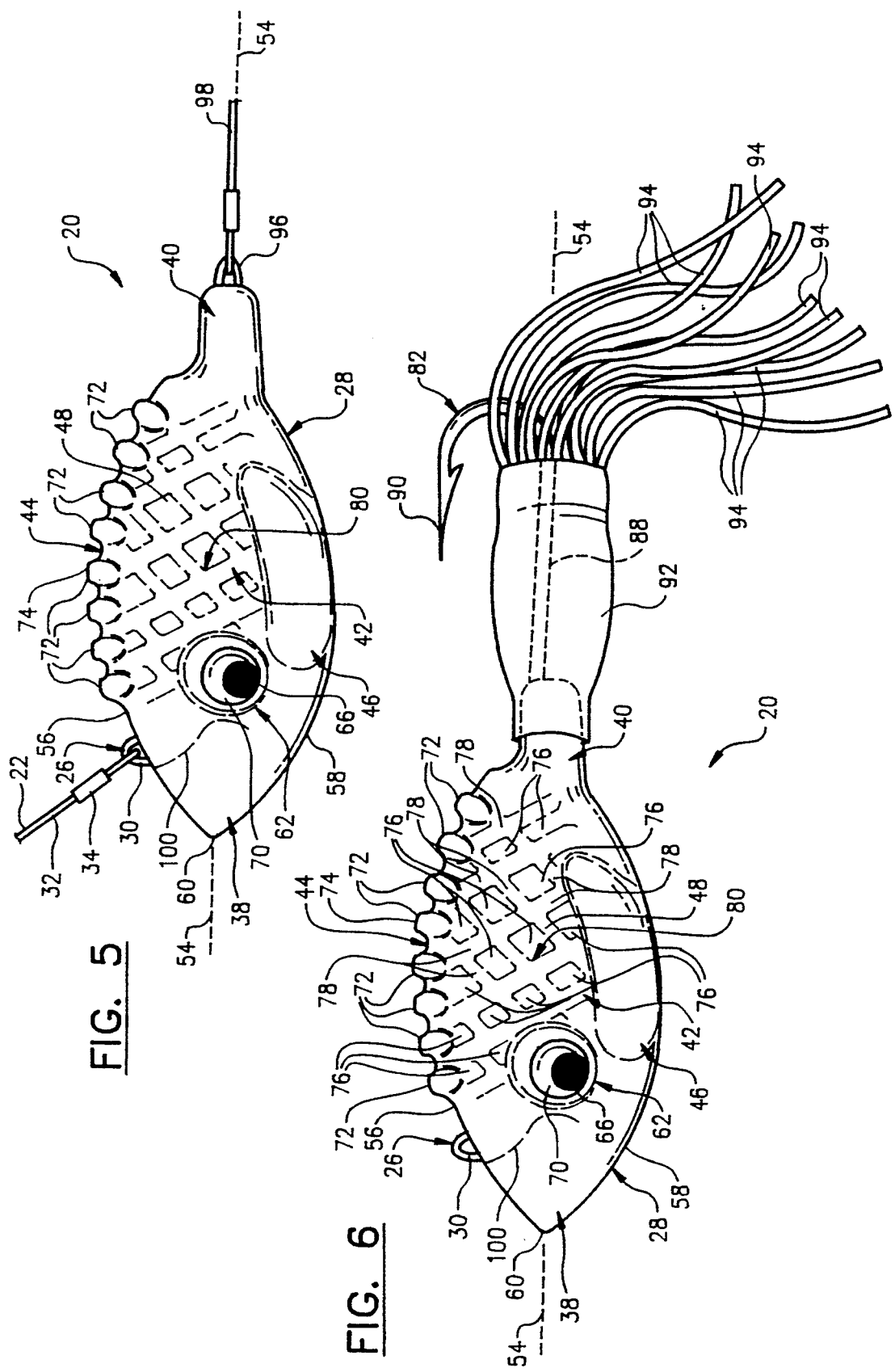

ARTIFICIAL FISHING LURE

COPYRIGHT NOTICE

©Copyright 1993, James R. Vance. All rights reserved.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNICAL FIELD

The present invention relates to artificial fishing lures. More particularly, this invention relates to an improved, combined weighted sinker, jig head, and artificial fishing lure that generally resembles a wide variety of forage fish.

BACKGROUND ART

Within the sports fishing industry, anglers have difficulty submerging their lure to a depth where fish are feeding. To submerge the lure, anglers often use lead weights called sinkers that are attached to a fishing line. Once the sinker is attached to the line, an additional length of line called a leader of approximately eighteen inches (18") to several feet in length is attached to the line below the sinker. The lure is then attached to the loose, terminal end of the leader. When the line is cast into a body of water, the sinker causes the line, leader, and lure to sink to a desired depth.

Much of the skill of fishing is in calculating the precise amount of sinker weight, length of cast line, amounts of expected line and lure drag, and the speed that the lure is traveling with respect to the water to place the lure at the proper depth.

In an effort to eliminate most of the aforesaid factors or variables, many trolling fisherman use what is called a downrigger. A downrigger is a piece of expensive equipment that is attached to the deck or gunwale of a boat. The downrigger generally comprises: a motorized reel having steel cable thereon; a large, round, extremely heavy, lead weight attached to the leading end of the cable; and an extension arm that can be moved to extend the weight over the gunwale of the boat.

During use, the fishing line, with a sufficient length of leader attached thereto and a lure at the end thereof, is removably attached to the weight and the weight is lowered into the water. The weight hangs almost directly downward from the extension arm. The amount of cable that is extended is measured to reveal the general depth of the trailing lure.

Although use of a downrigger system has many advantages, it can only be used while trolling in a relatively deep body of water. In addition, fishermen and women are becoming more aware that fish are very sensitive to seemingly innoxious tackle. For example, simple magnetic fields emitted from a boat have a dramatic impact on the feeding behavior of fish. Unfortunately the downrigger system places the lure nearly directly below the boat. Magnetic fields, engine noise, engine vibrations and resulting wave impulses, trace elements from the weight, cable, line, and/or lure, and many other factors, all combine and contribute to the various disadvantages of using a downrigger system.

An alternative method to place the lure at the desired depth is to use a trolling plane. A trolling plane generally comprises a flat, plate-like planing member that is used in place of a sinker or a downrigger system. The trolling plane is attached to the line at such an angle so that when the plane is dragged through the water, the water that is being pushed aside forces the plane downward to a lower depth. Although there are smaller sized planes that can be cast from shore into a large river, trolling planes are generally restricted to trolling from a boat.

The same drag that forces the trolling plane downward must be overcome to retrieve or reel-in any fish that is caught. Consequently, many different trolling planes have been designed that have two modes or positions of operation. The first mode or position of operation causes the plane to dive to deeper depths. Once a fish has taken the lure, it is intended that the swimming action of the fish causes the plane to pivot and switch to a second mode or position of operation.

When assuming its second more or position of operation, the plane is generally coplanar with the line being retrieved. Consequently, the drag coefficient of the plane with respect to the water within which it is traveling is greatly reduced, allowing for easier retrieval of the fish and tackle.

There are significant disadvantages of using a downrigger system and/or a trolling plane system. For example, both of such systems require use of additional substantial elements that are positioned on the fishing line between the lure and the fisherman. As a result, the line sensitivity or ability of the fisherman to determine whether or not a fish is striking or nibbling upon the bait or lure is greatly diminished.

For a true sport fisherman, the elimination of most all of the factors and variables of the sport, including the physical sensitive interaction between the fish, line, and fisherman translate to a dramatic decrease in the enjoyment of fishing.

Artificial, weighted "jig heads" have also been used within the fishing industry. A jig is typically a segment of rubber, plastic, or leather that generally resembles a worm, shrimp, tadpole, or frog. The jig is usually dressed with hair, feathers, or other protruding "rubbery" tentacles that jerk up and down or to and fro when drawn through water. A weighted ball or bullet-shaped pellet that has an eye connector at one end and a hook protruding from an opposed end is secured to the jig. The hook is used to secure the jig to the "jig head." The eye connector is used to secure the "jig head" to a fishing line.

The "jig head" is heavier than water. When the jig is secured to the "jig head" and both are cast into a body of water, the "jig head" causes the jig to sink.

It is important to note that the "jig head" functions simply as a weight, and generally does not represent anything in particular.

The inventor believes the above-listed apparatus and methods taken alone or in combination neither anticipate nor render obvious the present invention. These citations do not constitute an admission that such disclosures are relevant or material to the present claims. Rather, these citations relate only to the general field of the disclosure and are cited as constituting the closest art of which the inventor is aware.

DISCLOSURE OF INVENTION

The present invention combines the positive attributes of a weighted sinker and/or jig head with an extremely effective artificial lure that attracts the feeding behavior of a wide variety of feeding fish. The present invention eliminates the need to use a downrigger system, trolling plane system, or a separate sinker, leader line, and lure, with their respective snaps, joints, and barrel swivels, that were heretofore believed necessary. The elimination of these now extraneous elements greatly reduces the time and simplifies the procedure to setup, use, and dismantle effective fishing tackle.

The cumulative adverse effect on line sensitivity that such expensive, numerous, cumbersome, and difficult to use downrigger systems, trolling plane systems, sinkers, leader lines, lures, snaps, joints, and barrel swivels, that previously were believed necessary, is also eliminated in the present invention. Consequently, line sensitivity with the present invention is now greatly enhanced much to the delight of true sport fishermen and women.

The particular features of the present invention enable the lure to maintain a generally upright orientation when pulled through water. No longer is the lure inverted, turned upside-down, or spinning in an unnatural manner, when being pulled through the water. No longer is the lure spinning uncontrollably as it is pulled, which is a common action of other lures. Nor is the lure suspended in a vertical swimming position when the lure is used for jigging or mooching. Many of the actions, that were previously believed necessary, but were extremely unnatural actions of live bait, are eliminated or at least greatly reduced in the present invention.

A further objective of the present invention is to combine simultaneously both the diving and surfacing planing characteristics of a trolling plane with the sinking characteristics of a sinker.

The lures of the present invention may be easily changed from one size, color, and/or weight to another, in rapid fashion, without requiring any careful or critical attention by the fisherman or woman.

Another objective of the present invention is to provide apparatus and methods which are durable in design, easily constructed, inexpensive and economical to manufacture, and are simple to use.

The present invention not only overcomes all of the previously mentioned difficulties and disadvantages, but also achieves these general and specific objectives to provide a single, simple, compact, rugged, inexpensive lure that is capable of easy attachment and employment.

The combined sinker and artificial fishing lure of the present invention is provided with means for attaching the lure to a fishing line. The fishing lure has an oblong lure body portion that generally resembles or defines a fish. The characteristics of the body portion will be discussed in greater detail below.

The attaching means can comprise any convention or unconventional means for attaching the fishing line to the lure. The attaching means is secured to the body portion adjacent to the forward end thereof. The position of the attaching means relative to the body portion is such that the lure maintains a generally upright or slightly inclined orientation with respect to a generally horizontal path of travel as the lure is pulled forward through the water by a fishing line.

In the preferred embodiment, the attaching means comprises an eye connector that is affixed or operatively secured to an upper front end of the body portion. The eye connector projects or extends in a generally upward and forward direction from the body portion. If desired, swivels, snaps, and other forms of tackle hardware can be connected to the eye connector.

The body portion is substantially formed from a dense material that is heavier than water. In the preferred embodiment, the body portion is manufactured from lead. However, other dense materials could alternatively be used. Consequently, the body portion is easily and quickly submerged in water and in that regard functions similar to a sinker or weight.

The configuration and structure of the body portion are also important. To achieve the aforesaid goals, the body portion has: (i) a leading, forward end portion; (ii) an opposed, trailing, rearward tail portion; and (iii) a central or torso portion interposed between the forward end portion and the rearward tail portion. The torso portion further has opposed sides, an upper back portion, a belly portion, and a lower edge portion.

It is important to remember that the lure is designed to approximate and resemble corresponding features of a wide variety of foraging fish. For example, the forward end portion approximates or resembles the head of a forage fish. The body portion also attempts to generally approximate or resemble the body or torso of a fish.

The lure appearance, however, is not designed to be exactly like that of a particular fish. In fact, this is one of the unique features of the present invention. The configuration, design, and structural features of the present invention are proportioned and placed in such a manner as to maximize a general resemblance to a wide variety of forage fish. It is believed that both the differences as well as the similarities between such natural forage fish and the features of the present invention serve to attract game fish.

The attaching means or eye connector is preferably secured to the body portion so that the eye connector extends generally upward from the upper back portion of the lure. Such securement preferably occurs within the first one-sixth to one-half of the length of the body portion closest to the forward end portion.

The forward end portion functions as a leading bow, nose, and head of the lure that is generally tapered to a rounded apex or point to facilitate easy cutting through water. In fact, the upper back portion located forward of the attaching means toward the forward end portion defines at least a partial planing surface that is capable of urging the lure downward when the lure is towed through water. In essence, the water pressure that is being urged against the upper surface of the head or forward end portion of the lure causes the lure to dive downward.

The upper back portion of the preferred embodiment of the invention also has a plurality of protrusions jutting or extending outwardly therefrom. The protrusions generally resemble a spiny dorsal fin. The spiny dorsal fin interacts with the water, through which the lure is towed, to further approximate swimming movement and to generate sounds and shock waves that attract game fish.

Since the attaching means is generally coplanar with the spiny dorsal fin, the effect of the attaching means is masked and hidden by the waves and sounds generated by the spiny dorsal fin. In fact, placement of the attaching means at the particular location illustrated in the accompanying figures actually enhances the desired effect.

To further enhance such effects, the each opposed side of the lure body portion can be provided with a plurality of indentations and ridges. Such indentations and ridges are preferably formed directly within the lure and are designed generally to resemble a lattice-work. The lattice-work gives the lure the appearance of having fish scales. The light reflecting off the respective angles and facets of the indentations and ridges further imparts an impression that the lure is a swimming fish.

The belly portion is enlarged with respect to the opposed sides of the lure. Generally, the enlarged belly portion resembles an enlarged stomach or abdomen of the forage fish that the lure attempts to resemble. However, due to its enlarged size, the belly portion generally defines a ballast that is positioned near a centrally located lower edge of the lure.

Another way to describe the enlarged belly portion is that it resembles the lower hull of a boat. The inventor affectionately refers to the lure of the present invention as a "boat belly lure."

If a lattice-work is used, the enlarged belly portion can be positioned generally below the lattice-work.

Due to the placement of the mass contained within the enlarged belly, the center of gravity or weight of the lure is lowered and centralized. When the lure is allowed to sink or dive within the water, the lure maintains a generally upright orientation. Such an orientation further approximates the swimming action of forage fish.

To further induce a generally upright lure orientation or position while the lure is being towed through water, the remaining body portion of the lure is relatively thin. In essence, the body portion defines an upright rudder that maintains its upright position while being pulled through the water.

Furthermore, the lower edge of the body portion, and/or belly portion, of the lure that is located toward the forward end portion defines at least a partial planing surface that is capable of urging the lure upward when the lure is towed through water.

The interaction of the fishing line, spiny dorsal fin, side lattice-work, planing leading, forward end portion, planing belly portion, enlarged belly portion, and thin rudder characteristics all contribute to an artificial fishing lure that has a new, unique, strikingly successful towing action that heretofore was unknown. Combining these features with the diving characteristics of the present invention creates a lure that is unparalleled in effectiveness.

To further resemble forage fish, each of the opposed sides is provided with an eye portion that protrudes outwardly therefrom. Each respective eye portion is located nearer toward the forward end portion than toward the tail portion.

Each eye portion is positioned generally below and aftward of the attaching means. For example, in the preferred embodiment of the invention, the attaching means is located generally equidistant between the forward end portion and the eye portion. Similarly, each eye portion is located generally equidistant between the upper ridge of the upper back portion and the lower edge of the belly or body portion. The enlarged belly portion is also positioned generally below and aftward of the eye portions. The lattice-work is formed within the opposed sides aftward of the eye portion.

The eye portions may be painted to appear like fish eyes.

Alternatively each eye portion can define an enclosed chamber therein. The eye portion that defines the enclosed chamber has an outer surface that is made of a transparent or translucent material. Each eye portion may further be provided with a pupil portion that is located within the enclosed chamber.

In the preferred embodiment, the pupil portion is capable of movement within the enclosed chamber. In addition, the eye portions may be provided with a light reflective surface that is located within the enclosed chamber.

The tail portion of the lure may be provided with a fish hook extending aftward of the body portion. In the preferred embodiment, the fish hook is positioned, with respect to the lure, so that the hook is turned upward. In other words, the hook is positioned so that a point thereof is positioned upward from a shank thereof when the lure is pulled through water. This orientation permits the lure to pass through grass, weeds, and other obstructions without the hook becoming undesirably attached to underwater debris. This orientation also optimizes the hook gap between the point and shank of the hook.

The fish line that is towing or drawing the lure through the water further serves to deflect such debris away from the fish hook, leaving the fish hook easily available to be captured by any following predatory fish.

A natural and/or artificial bait, grub, worm, or squid can be attached directly or indirectly to the hook.

Instead of having a fish hook extend aftward directly from the body portion of the lure, a second eye connector can be used. For example, in an alternative embodiment of the invention, a second eye connector extends aftward of the body portion. The second eye connector enables additional tackle, such as a leader line, swivel, or other equipment, to be attached thereto.

The artificial lure of the present invention may also be provided with a tail portion that defines an elongated post, shaft, shank, tube, or collet that extends aftward from the body portion. Such elongated post may serve as means for attaching either the fish hook or the second eye connector to the body portion of the lure. In essence, the hook and/or second eye connector would extend aftward from the body portion from the elongated post, shaft, shank, tube, or collet.

The elongated post of the tail portion may also serve as means for attaching at least one collar, sleeve, or skirt apparatus to the lure. Such collars, sleeves, or skirts may be manufactured of an elastic rubber, synthetic rubber, or plastic material that is capable of being stretched to fit over the post, shaft, shank, tube, or collet and be held in place by contraction of its material to cause a friction fit therebetween.

Furthermore, the lure can be provided with other means to attached the collar, sleeve, or skirt thereto. For example, a protrusion, ridge, trough, channel or other mechanical means to increase the engagement and frictional resistance between the lure and collar, sleeve, or skirt can be used.

In the preferred embodiment of the invention, the collar, sleeve, or skirt is further provided with a plurality of flexible, elongated, tentacles that extend therefrom. Such tentacles can be manufactured from what has become known as "live rubber" or a material that has a great degree of flexibility.

The collar, sleeve, or skirt need not be attached directly to the elongated post. Instead, the collar, sleeve, or skirt could be attached to the fish hook, to the second eye connector, or to tackle that is attached to and dragged behind the lure.

These and other objectives and advantages of the present invention will become more readily apparent upon reading the following disclosure and referring to the attached drawings.

BRIEF DESCRIPTION OF DRAWINGS

FIG. 5 is a side elevational view of a second embodiment of the invention, wherein a second eye loop is used in place of a hook.

FIG. 6 is a side elevational view of the lure shown in FIG. 2, except that a skirt is further attached to the lure.

Figure 1:
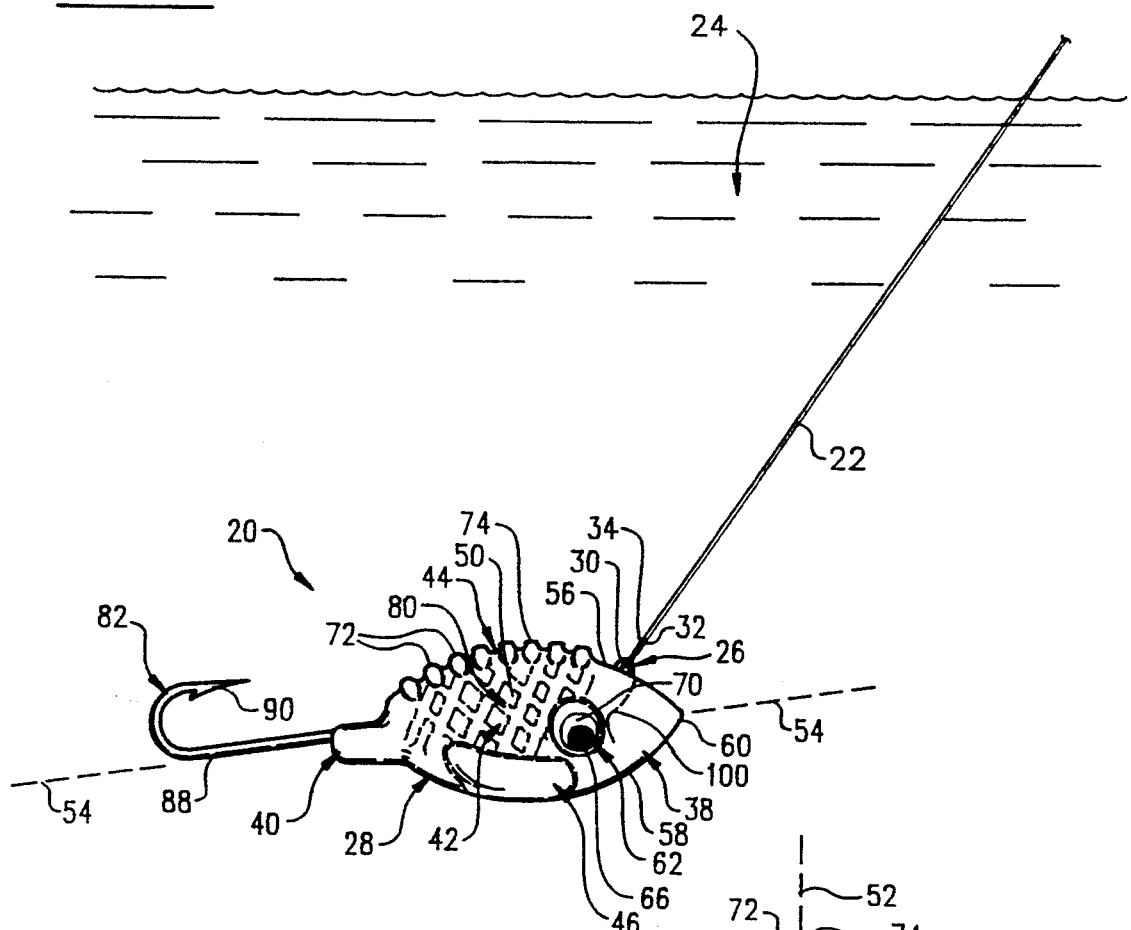
FIG. 1 is a schematic, side elevational view of the artificial lure made in accordance with the present invention, the lure being attached to a line and being submerged and pulled through a body of water.

One should understand the drawings are not necessarily to scale and the elements are sometimes illustrated by graphic symbols, phantom lines, diagrammatic representations, and fragmentary views. In certain instances, the inventor may have omitted details that are not necessary for an understanding of the present invention or that render other details difficult to perceive.

BEST MODE FOR CARRYING OUT THE INVENTION

Referring to the drawings, wherein like numerals indicate like parts, the present invention is a combined sinker and artificial fishing lure 20 that is attachable to a fishing line 22 and is capable of being submerged under water 24.

For ease in describing the various features of the invention, each structural element and/or portion of lure 20 shall be identified. In general, lure 20 comprises: (a) means 26 for attaching lure 20 to fishing line 22, and (b) and an oblong body portion 28 that generally defines or resembles a fish.

Attaching means 26 may comprise any structure that is capable of operatively securing body portion 28 to fishing line 22. For example, attaching means 26 may comprise an eye connector 30 that is formed integrally with, imbedded within, or is fixedly or removably secured to body portion 28.

Within the preferred embodiment of the invention, attaching means 26 comprises a loop of wire that protrudes outwardly from body portion 28.

Attaching means 26 is created by suspending a looped segment of wire within a mold having two mating sides that define a cavity therein. The placement of the wire is such that once the cavity is filled with molten lead, the lead is sufficiently cooled, and the molded body portion 28 is removed from the mold, a portion of the loop of wire protrudes outwardly from the cooled, molded body portion 28.

A terminal end 32 of fishing line 22 can be passed through the loop of attaching means 26 and adequately tied to form a secured knot 34. In essence, the loop of attaching means 26 defines eye connector 30.

Other apparatus or tackle can also or alternatively be connected to attaching means 26. For example, if desired, a spindle, swivel, leader line, snap, or other form of fishing tackle (not shown) can be connected between fishing line 22 and attaching means 26.

The placement of attaching means 26 with respect to the other structural features of lure 20 will be described further below.

Body portion 28 is substantially formed from a dense material that is heavier than water 24. For example, in the preferred embodiment of the invention, body portion 28 is formed by cooling molten lead within a mold cavity. Lead is a very commonly used material to form sinkers and other devices intended to submerge lures under water 24. Other materials, however, such as metal and/or ceramics, could alternatively be used with similar effectiveness.

Body portion 28 generally comprises: (a) a leading, forward end portion 38; (b) an opposed, trailing, rearward tail portion 40; and (c) a central or torso portion 42 that is interposed between forward end portion 38 and rearward tail portion 40.

Forward end portion 38 generally defines and/or resembles a head of a wide variety of forage fish. Rearward tail portion 40 is configured to define and/or generally resemble a caudal peduncle of a fish that would be located between the truck and tail or caudal fin of a fish. Torso portion 42 generally defines and/or resembles the main trunk, torso, or body of a fish that is located between forward end portion 38 and rearward tail portion 40.

More particularly, torso portion 42 has an upper back portion 44, a belly portion 46, and opposed sides 48 and 50. Opposed sides 48 and 50 are generally symmetrical with one another and extend outwardly from a generally vertical plane 52 that passes through a longitudinal axis 54 of lure 20. An upper edge 56 is located about the uppermost portions of body portion 28. Similarly, a lower edge 58 is located about the lowermost portions of body portion 28. Consequently, upper edge 56 and lower edge 58 are centrally located within vertical plane 52.

The relative narrowness of body portion 28 with respect to its length, combined with the height of lure 20, creates a generally upright rudder that tracks very well when pulled through water 24.

It should be noted that belly portion 46 is located near or adjacent to lower edge 58 and is symmetrically balanced about vertical plane 52.

Belly portion 46 is further enlarged with respect to the thickness of opposed sides 48 and 50. Belly portion 46 generally defines and/or resembles an enlarged stomach or abdomen of a fish. By placing a greater amount of mass within enlarged belly portion 46, belly portion 46 can function as a ballast, similar to ballast keel of a sailboat, thereby imparting greater stability to lure 20 when pulled through water 24.

The tracking ability of lure 20, due to the rudder effect of body portion 28, combines with the stability imparted by the ballast of belly portion 46 to urge and maintain lure 20 in a generally upright position when lure 20 is towed through water 24.

When viewed from its side, as best seen in FIGS. 1, 2, 5, and 6, forward end portion 38 and torso portion 42 generally have a combined convex-convex configuration. Such a convex-convex configuration not only approximates the general appearance of a fish, but also creates two planing surfaces that are capable of urging the lure upward and/or downward when lure 20 is towed through water 24. For example, lower edge 58 located toward forward end portion 38 can define a planing hull or surface that urges lure 20 upward. Similarly, upper edge 56 located toward forward end portion 38 defines a planing hull or surface that urges lure 20 downward.

By controlling the relative size and positional location of such planing surfaces, the swimming or towing characteristics of lure 20 can be altered. In other words, various different embodiments of the invention can be created by positioning a juncture 60, where upper edge 56 meets and combines with lower edge 58, either above or below longitudinal axis 54.

The relative planing surfaces or thickness of the upper edge 56 and lower edge 58, that comprise and define forward end portion 38, can also be altered to modify the swimming or towing characteristics of lure 20. For example, the width or thickness of lower edge 58 can be greater than that of upper edge 56. This structure would impart greater upwardly planing characteristics to lure 20. Conversely, if the width or thickness of upper edge 56 was greater than that of lower edge 58, lure 20 would have a greater ability to plane in a downwardly slopping direction.

The inventor has found that the particular structure of the present invention attracts a wide variety of predatory fish. The inventor believes that such attraction is a result of not only the enhanced swimming or towing characteristics of lure 20, but is also due to the unique surface features and the placement of such features in relation to the overall shape and configuration of lure 20 as a whole.

For example, in the preferred embodiment of the invention, as depicted in the figures, each opposed side 48 and 50 has an eye portion 62 protruding or extending outwardly therefrom. Eye portions 62 are located more toward forward end portion 38 than toward tail portion 40. Eye portions 62 are also located generally equidistant between upper edge 56 of upper back portion 44 and lower edge 58 of belly portion 46.

Attaching means 26 or eye connector 30 extends generally upward from upper edge 56 of upper back portion 44. Attaching means 26 is also generally coplanar with vertical plane 52. Consequently, eye portions 62 are positioned generally below attaching means 26. In addition, it is preferred that eye portions 62 be positioned generally aftward of attaching means 26.

If the aforesaid structure is used, attaching means 26 can be located generally equidistant between forward end portion 38 and eye portion 62.

In the preferred embodiment, enlarged belly portion 46 is positioned generally below and aftward of eye portion 62.

Figure 3:
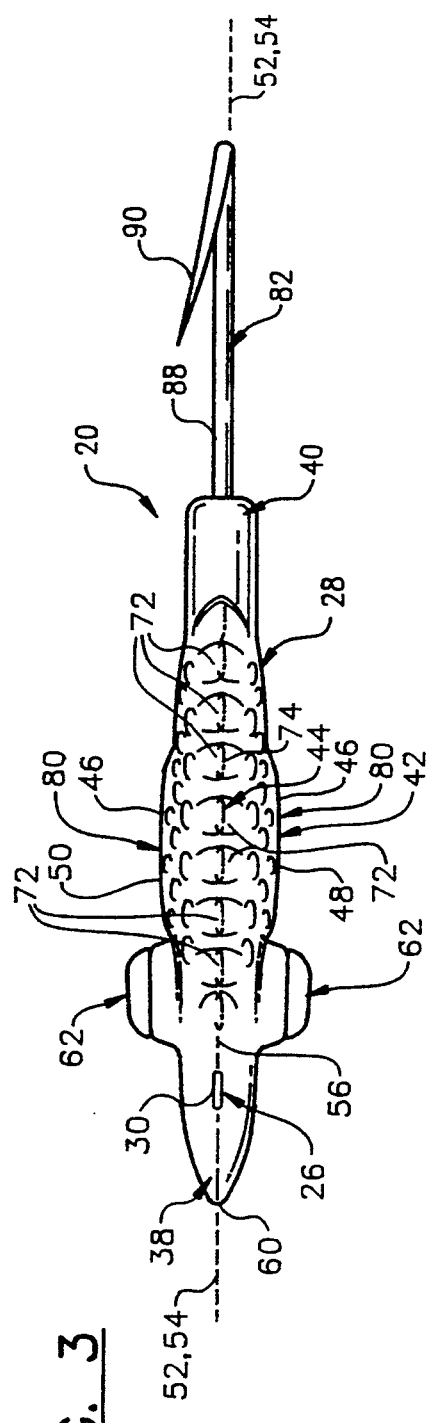
FIG. 3 is a plan view of the lure shown in FIGS. 1 and 2.

Eye portion 62 may simply comprise a protrusion or appendage of body portion 28. For example, eye portion 62 may be formed integrally with body portion 28. Eye portion 62 may be made of lead, metal, ceramic, or other heavy material. A solid eye portion 62, wherein the coloring of the eye is simply painted onto a unitary body portion 62 is illustrated in FIG. 3.

Figure 4:
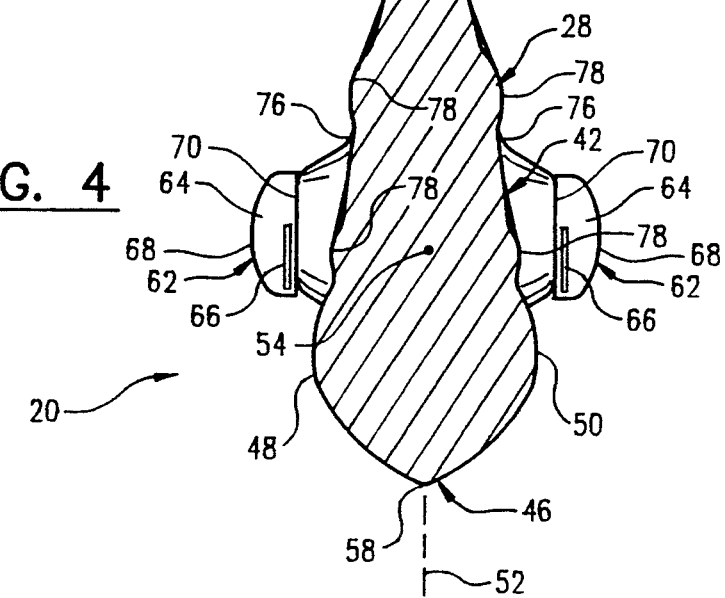
FIG. 4 is a cross-sectional view of the lure illustrated in FIGS. 1 through 3, as viewed along a plane defined by line 4—4 in FIG. 2.
Figure 2:
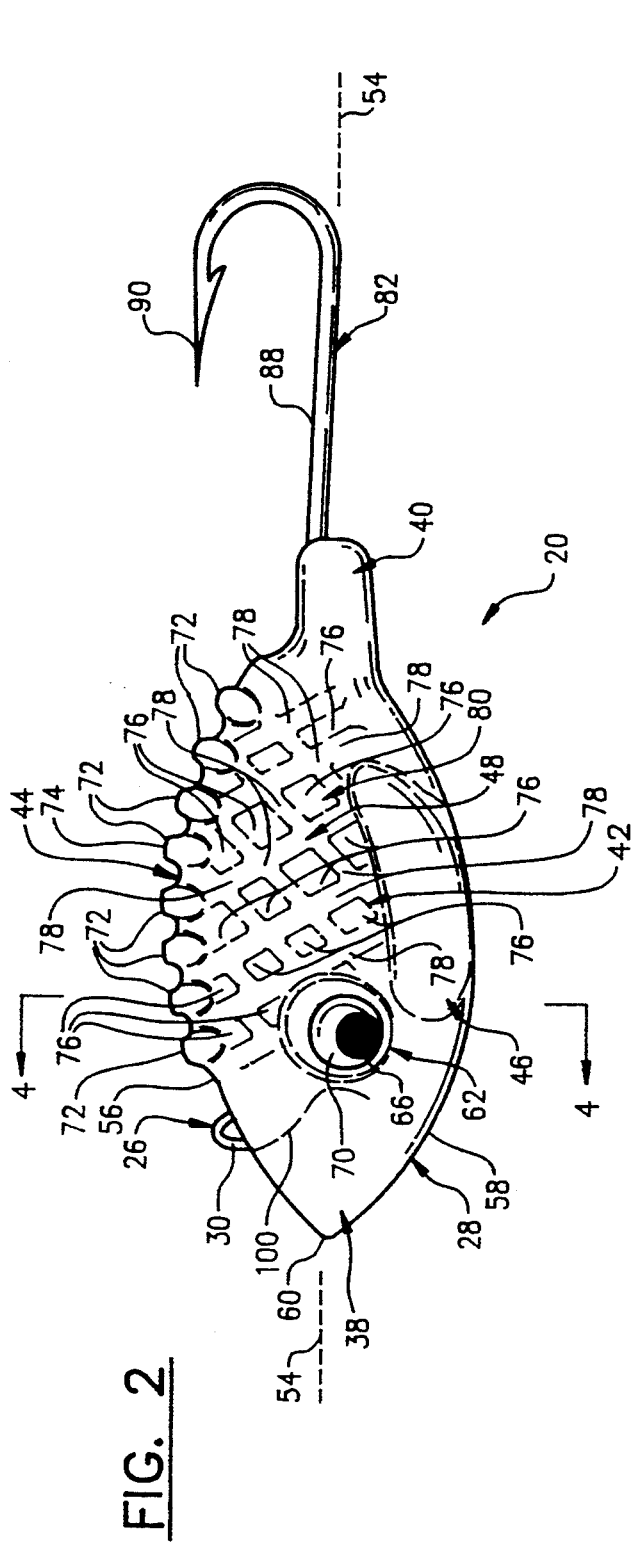
FIG. 2 is an enlarged, side elevational view of the lure shown in FIG. 1.

Alternatively, eye portion 62 may comprise a hollow, movable or stationary eye commonly sold within craft stores for dolls, figurines, and the like. For example, as illustrated in FIG. 4, eye portion 62 may define an enclosed chamber 64. Eye portion 62 may further comprise a pupil portion 66 that is located within enclosed chamber 64. Although not absolutely required, pupil portion 66 may be capable of movement within chamber 64. To enable a predatory fish to see the movement of pupil portion 66, an outer surface 68 of eye portion 62, that defines the outer boundary of chamber 64, should be made of a transparent and/or translucent material.

Eye portion 62 may further have a light reflective surface 70 that is located within chamber 64. Light reflective surface 70 is juxtaposed between body portion 28 and pupil portion 66. In this manner, when viewed by predatory fish, pupil portion 66 is silhouetted against a backdrop of reflective surface 70 and either side 48 or 50.

Please note the substantial size of eye portion 62 with respect to the remainder of body portion 28. Please also note the substantial outward protrusion of eye portion 62 from sides 48 and 50. It is believed that by accentuating eye portion 62 and combining the use of movable pupil portion 66 and reflective surface 70 within chamber 64 predatory fish are further attracted by giving the impression that lure 20 is live, albeit unusual, bait.

Lure 20 may further include a plurality of protrusions 72 that jut or extend outwardly from upper edge 56 of upper back portion 44. Protrusions 72 generally define a spiny dorsal fin 74.

As discussed above, spiny dorsal fin 74 has several characteristics, one of which is to appear similar to a spiny dorsal fin of forage fish. Another characteristic or feature of spiny dorsal fin 74 is to interact with water 24 to further approximate swimming movement of a fish. In addition, spiny dorsal fin 74 interacts with water 24 to generate sounds and shock waves that attract game fish.

Since in the preferred embodiment attaching means 26 is generally coplanar with spiny dorsal fin 74, the effect of fishing line 22 being attached to attaching means 26 is masked and hidden by the waves and sounds generated by spiny dorsal fin 74. In fact, placement of attaching means 26 at the particular location illustrated in FIGS. 1 through 6 actually enhances the desired effect because eye connector 30 appears and functions as though it is a part of spiny dorsal fin 74.

To further enhance the attractant effect of lure 20, each opposed side 48 and 50 can be provided with a plurality of indentations 76 and ridges 78. Indentations 76 and ridges 78 are preferably formed directly within lure 20 and are designed generally to resemble a lattice-work 80. When light is reflected off the various surfaces of lattice-work 80, lure 20 has an appearance of having fish scales. In other words, the light rays reflecting off the respective angles and facets of indentations 76 and ridges 78 further impart an impression that lure 20 is a swimming fish.

In the preferred embodiment of the invention, belly portion 46 is positioned generally below lattice-work 80. Eye portion 62 is located nearer toward forward end portion 38 than toward tail portion 40. Lattice-work 80 is formed within opposed sides 48 and 50 aftward or rearward of eye portion 62.

As seen in FIGS. 1, 2, 3, 5, and 6, trailing tail portion 40 is located aftward of torso portion 42.

In one embodiment, a fish hook 84 is incorporated into body portion 28 so that hook 84 extends aftward therefrom.

Most notably, in the preferred embodiment of the invention, tail portion 40 is provided with an elongated post, shaft 86, shank, tube, or collet that extends aftward or rearward from lure 20. Shaft 86 is molded and/or formed about a shank 88 of hook 84. Shank 88 extends rearwardly and is turned upward to that a point 90 of hook 84 is positioned upward from shank 88 when lure 20 is pulled through water 24.

Natural and/or artificial bait, such as fish, grubs, worms, frogs, shrimp, and/or squid can be attached directly to hook 84.

As illustrated in FIG. 6, in addition to using such bait, or in lieu thereof, one or more collars, sleeves, and/or skirts 92 can be operatively attached to shaft 86. For example, in the preferred embodiment, at least one ring skirt 92 is manufactured of an elastic rubber, synthetic rubber, or plastic material that is capable of being stretched to fit over shaft 86. Such pliant material is often called "live rubber" and serves as a very effective fish attractant. Skirt 92 encircles shaft 86 and extends outwardly and/or rearwardly therefrom.

Once allowed to contract, skirt 92 is held mechanically in place by a friction fit between skirt 92 and shaft 86. Skirts 92 are most effective when they have a plurality of tentacles 94 or strings that extend therefrom.

In an alternative embodiment, as illustrated in FIG. 5, instead of having hook 84 extend aftward of tail portion 40, a second eye connector 96 extends aftward of shaft 86. Placement of second eye connector 96 as illustrated and described enables the additional tackle to be attached thereto. A leader line 98 can then be attached to lure 20 and one or more trailing hooks (not shown) can be secured to leader line 98. Such trailing hooks can be pivotally secured either to leader line 98 or be operably connected directly to second eye connector 96.

Lure 20 may also have a line, ridge, or indentation that generally resembles an operculum, gill opening, and/or upper jaw line 100. Please note that jaw line 100, illustrated in FIGS. 1, 2, 5, and 6, is positioned forward of eye portion 62. However, jaw line 100 does not necessarily lead directly to the apex or juncture 60 of forward end portion 38.

Once lure 20 is formed and cooled, lure 20 can be dipped, sprayed, or painted with one or more coats of an opaque, transparent, and/or translucent covering, such as paint, enamel, varnish, and/or laquer. Such coat is intended to both further approximate the coloring of various fish, or at least use a colorant that attracts preditory fish, and increase the reflectivity of the various features of lure 20. Thus, by using one or more of such coats, the attractive capability of lattice-work 80, spiny dorsal fin 74, eye portion 62, and of the remaining portions of lure 20 is further enhanced.

Such coats need not be uniform in color. In fact, the inventor prefers that variations in coloring appear on lure 20.

Lure 20 can also be provided with an internal harness, directly connecting attaching means 26 to fish hook 84.

The means and construction disclosed herein are by way of example and comprise primarily the preferred form of putting the invention into effect. Although the drawings depict preferred and alternative embodiments of the invention, other embodiments have been described within the preceding text. One skilled in the art may appreciate that the disclosed device may have a wide variety of shapes and configurations. Additionally, persons skilled in the art to which the invention pertains might consider the foregoing teachings in making various modifications, other embodiments, and alternative forms of the invention.

It is, therefore, to be understood that the invention is not limited to the particular embodiments or specific features shown herein. To the contrary, the inventor claims the invention in all of its forms, including all alternatives, modifications, equivalents, and alternative embodiments that fall within the legitimate and valid scope of the appended claims, appropriately interpreted under the Doctrine of Equivalents.

INDUSTRIAL APPLICABILITY

The artificial lure apparatus and methods for use thereof as described herein may be used within the sport fishing industry to attract and capture fish. The disclosed invention enables a fisherman or woman to quickly, easily, and selectively attach a weighted artificial lure to a fishing line without requiring use of a downrigger system, trolling plane system, additional sinker, leader, etc., and their associated snaps, joints, and barrel swivels.

Artificial lures created using this invention are very durable in design, easily constructed, rugged, inexpensive and economical to manufacture, and are extremely simple to use. Traditional and/or nontraditional fishing techniques may be used with the lure in open water, such as for trolling, casting, mooching, jigging. Alternatively, the lure may be used for ice fishing.

The present invention not only increases the effectiveness of attracting and catching fish, it also significantly reduces the amount of expensive, and cumbersome tackle that would otherwise be required.

The unique features of this invention are also such that the lure approximates the design of a wide variety of forage fish. Consequently, a single lure can be used to attract and catch a very wide range of fish species.

I claim:

1. A combined sinker and artificial fishing lure capable of being submerged under water, said lure being attachable to a fishing line, said lure comprising:
   (a) means for attaching said lure to the fishing line; and
   (b) an oblong body portion generally resembling a fish, said attaching means being operatively secured to said body portion, said body portion being substantially formed from a dense material that is heavier than water, said body portion having
      (i) a leading, forward end portion,
      (ii) an opposed, trailing, rearward tail portion,
      (iii) a central or torso portion interposed between said forward end portion and said rearward tail portion, said torso portion having opposed sides, an upper back portion, and a belly portion, said belly portion being enlarged with respect to said opposed sides, said belly portion generally defining an enlarged stomach or abdomen of said lure, said belly portion generally defining a ballast positioned near a centrally located lower edge of said lure, said body portion generally defining an upright rudder, said belly portion and said body portion being capable of urging said lure to maintain a generally upright position when said lure is towed through water.

2. The combined sinker and artificial fishing lure of claim 1, wherein said upper back portion has a plurality of protrusions jutting or extending outwardly therefrom, said protrusions generally defining a spiny dorsal fin, said attaching means being generally coplanar with said spiny dorsal fin.

3. The combined sinker and artificial fishing lure of claim 1, wherein said lower edge of said body portion located toward said forward end portion defines at least a partial planing surface that is capable of urging said lure upward when said lure is towed through water.

4. The combined sinker and artificial fishing lure of claim 1, wherein said upper back portion located forward of said attaching means toward said forward end portion defines at least a partial planing surface that is capable of urging said lure downward when said lure is towed through water.

5. The combined sinker and artificial fishing lure of claim 1, wherein said attaching means further comprises an eye connector extending generally upward from said upper back portion.

6. The combined sinker and artificial fishing lure of claim 1, wherein each of said opposed sides has an eye portion protruding or extending outwardly therefrom, said eye portion being located nearer toward said forward end portion than toward said tail portion.

7. The combined sinker and artificial fishing lure of claim 6, wherein said eye portion is located generally equidistant between said upper back portion and said lower edge portion.

8. The combined sinker and artificial fishing lure of claim 6, wherein said eye portion is positioned generally below said attaching means.

9. The combined sinker and artificial fishing lure of claim 6, wherein said eye portion is positioned generally aftward of said attaching means.

10. The combined sinker and artificial fishing lure of claim 6, wherein said attaching means is located generally equidistant between said forward end portion and said eye portion.

11. The combined sinker and artificial fishing lure of claim 6, wherein said belly portion is positioned generally below and aftward of said eye portion.

12. The combined sinker and artificial fishing lure of claim 6, wherein said eye portion defines an enclosed chamber therein, said eye portion further having a pupil portion located within said enclosed chamber, said pupil portion being capable of movement.

13. The combined sinker and artificial fishing lure of claim 12, wherein said eye portion that defines said enclosed chamber has an outer surface that is made of a transparent or translucent material.

14. The combined sinker and artificial fishing lure of claim 13, wherein said eye portion has a light reflective surface located within said enclosed chamber.

15. The combined sinker and artificial fishing lure of claim 1, wherein said opposed sides each have a plurality of indentations and ridges formed therein generally defining a lattice-work.

16. The combined sinker and artificial fishing lure of claim 15, wherein each of said opposed sides has an eye portion protruding outwardly therefrom, said eye portion being located nearer toward said forward end portion than toward said tail portion, said lattice-work being formed within said opposed sides aftward of said eye portion.

17. The combined sinker and artificial fishing lure of claim 15, wherein said belly portion is positioned generally below said lattice-work.

18. The combined sinker and artificial fishing lure of claim 1, wherein said tail portion has an elongated post, shaft, shank, tube, or collet extending therefrom.

19. The combined sinker and artificial fishing lure of claim 18, wherein said tail portion further has at least one collar, sleeve, or skirt that is capable of being operatively attached to said elongated post, shaft, shank, tube, or collet.

20. The combined sinker and artificial fishing lure of claim 19, wherein said collar, sleeve, or skirt is manufactured of an elastic rubber, synthetic rubber, or plastic material that is capable of being stretched to fit over said post, shaft, shank, tube, or collet and be held in place by contraction of said material to cause a friction fit therebetween.

21. The combined sinker and artificial fishing lure of claim 19, wherein said collar, sleeve, or skirt has a plurality of tentacles extending therefrom.

22. The combined sinker and artificial fishing lure of claim 1, wherein said lure further has a fish hook extending aftward of said body portion.

23. The combined sinker and artificial fishing lure of claim 2, wherein said tail portion has an elongated post, shaft, shank, tube, or collet extending therefrom, said hook extending aftward from said body portion from said elongated post, shaft, shank, tube, or collet, said hook being positioned with respect to said lure such that said hook is turned upward so that a point thereof is positioned upward from a shank thereof when said lure is pulled through water.

24. The combined sinker and artificial fishing lure of claim 22, further comprising a natural or artificial bait, grub, worm, or squid attached to said hook.

25. The combined sinker and artificial fishing lure of claim 1, wherein said lure further has a second eye connector extending aftward of said body portion, said second eye connector enabling additional tackle to be attached thereto.

* * * * *

UNITED STATES PATENT AND TRADEMARK OFFICE
CERTIFICATE OF CORRECTION

PATENT NO. : 5,349,776
DATED : September 27, 1994
INVENTOR(S) : Mark H. Lucas

It is certified that error appears in the above-identified patent and that said Letters Patent is hereby corrected as shown below:

Column 14, line 35, delete "2" and insert therefor --22--.

Signed and Sealed this

Twenty-fourth Day of January, 1995

Attest:

BRUCE LEHMAN

Attesting Officer    Commissioner of Patents and Trademarks